(12) United States Patent
Kogure (10) Patent No.: US 10,071,697 B2
(45) Date of Patent: Sep. 11, 2018

(54) WIRING HARNESS WIRED BETWEEN CAR BODY AND SLIDING DOOR OF VEHICLE

(71) Applicant: Yazaki Corporation, Minato-ku, Tokyo (JP)

(72) Inventor: Naoto Kogure, Susono (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 15/493,202

(22) Filed: Apr. 21, 2017

(65) Prior Publication Data
US 2017/0217387 A1    Aug. 3, 2017

Related U.S. Application Data

(63) Continuation of application No. PCT/JP2015/080232, filed on Oct. 27, 2015.

(30) Foreign Application Priority Data

Oct. 27, 2014    (JP) .................. 2014-218372

(51) Int. Cl.
*B60R 16/02*    (2006.01)
*H02G 11/00*    (2006.01)
(Continued)

(52) U.S. Cl.
CPC ........ *B60R 16/0215* (2013.01); *B60R 16/027* (2013.01); *H01B 7/0045* (2013.01);
(Continued)

(58) Field of Classification Search
CPC ... B60R 16/0215; B60R 16/02; H01B 7/0045; H01B 7/00; H02G 11/006; H02G 11/00
(Continued)

(56) References Cited

U.S. PATENT DOCUMENTS 7,980,622 B2    7/2011    Noritsugu et al.
8,070,212 B2 *  12/2011   Shima ................ B60R 16/0207
                                              296/146.9
(Continued)

FOREIGN PATENT DOCUMENTS

CN    101522472 A    9/2009
CN    101633303 A    1/2010
(Continued)

OTHER PUBLICATIONS

Oct. 3, 2017—(JP) Notification of Reasons for Refusal—App 2014-218372, Eng Tran.
(Continued)

*Primary Examiner* — Michael F McAllister
(74) *Attorney, Agent, or Firm* — Banner & Witcoff, Ltd.

(57) ABSTRACT

A wiring harness which is wired between a car body and a sliding door which slides between a closing position and an opening position so as to open and close a doorway in the car body, the wiring harness includes an external member in which one end is supported rotatably about a perpendicular axis relative to the car body and in which the other end is supported rotatably about a perpendicular axis relative to the sliding door. The external member includes bending portions at a sliding door side and at a car body side respectively in a closing state that the sliding door is disposed in the closing position. The bending portions are bent in opposite directions to each other, and a curvature radius of one of the bending portions is smaller than a curvature radius of the other of the bending portions.

8 Claims, 8 Drawing Sheets

(51) Int. Cl.
    *H01B 7/00*     (2006.01)
    *B60R 16/027*     (2006.01)
    *H02G 3/04*     (2006.01)
    *H02G 3/06*     (2006.01)

(52) U.S. Cl.
    CPC ........... *H02G 11/00* (2013.01); *H02G 11/006* (2013.01); *H02G 3/0468* (2013.01); *H02G 3/0616* (2013.01)

(58) Field of Classification Search
    USPC ........................................................ 174/72 A
    See application file for complete search history.

(56) References Cited

U.S. PATENT DOCUMENTS

| | | | | |
|---|---|---|---|---|
| 8,227,694 | B2* | 7/2012 | Murayama | B60R 16/0207 174/101 |
| 9,150,168 | B2* | 10/2015 | Inoue | H02G 11/006 |
| 9,173,311 | B2* | 10/2015 | Ikeda | B60R 16/027 |
| 9,738,240 | B2* | 8/2017 | Kogure | B60R 16/027 |
| 2002/0151213 | A1* | 10/2002 | Aoki | B60R 16/0215 439/502 |
| 2007/0107926 | A1* | 5/2007 | Nishijima | H02G 11/006 174/72 A |
| 2009/0178340 | A1 | 7/2009 | Noritsugu et al. | |
| 2010/0018766 | A1 | 1/2010 | Shimonishi et al. | |
| 2013/0180776 | A1 | 7/2013 | Gotou et al. | |
| 2014/0299370 | A1 | 10/2014 | Ikeda | |
| 2015/0325989 | A1 | 11/2015 | Sekino et al. | |

FOREIGN PATENT DOCUMENTS

| | | |
|---|---|---|
| JP | 2008-143329 A | 6/2008 |
| JP | 2011-126364 A | 6/2011 |
| JP | 2012-080672 A | 4/2012 |
| JP | 5085943 B2 | 11/2012 |
| JP | 2013-150540 A | 8/2013 |
| JP | 2013-162716 A | 8/2013 |
| JP | 2014-143781 A | 8/2014 |
| WO | 2013094550 A1 | 6/2013 |
| WO | 2014115676 A1 | 7/2014 |

OTHER PUBLICATIONS

Jan. 26, 2016—(WO) Written Opinion of the ISA—App PCT/JP2015/080232 Eng Trans.
Mar. 7, 2017—(JP) Notification of Reasons for Refusal—App 2014-218372—Eng Tran.
Jan. 26, 2016—International Search Report—Intl App PCT/JP2014/5080232.
Mar. 12, 2018—(CN) The First Office Action—App 201580058460.2, Eng Tran.

* cited by examiner

WIRING HARNESS WIRED BETWEEN CAR BODY AND SLIDING DOOR OF VEHICLE

CROSS REFERENCE TO RELATED APPLICATIONS

This application is a continuation of PCT application No. PCT/JP2015/080232, which was filed on Oct. 27, 2015 based on Japanese Patent Application (No. 2014-218372) filed on Oct. 27, 2014, the contents of which are incorporated herein by reference.

BACKGROUND OF THE INVENTION

Field of the Invention

The present invention relates to a wiring harness which is wired between a car body and a sliding door of a vehicle.

Description of Related Art

As wiring harnesses which are wired on a vehicle, there is a wiring harness which is wired between a car body and a sliding door which can slide to and from a doorway in the car body of the vehicle (for example, refer to Patent Literature 1: JP-B-5085943).

[Patent Literature 1]: JP-B-5085943

Incidentally, a wiring harness which is wired between a car body and a sliding door of a vehicle is required to be bent stably in a specified direction when the sliding door is opened and closed.

According to a related art, a wiring harness is caused to protrude towards a car body by a biasing device so that the wiring harness bends towards the car body when a sliding door is closed. By doing so, the wiring harness stably bends so as to protrude in a predetermined direction when the sliding door is opened and closed.

However, since this wiring harness is caused protrude towards the car body when the sliding door is closed, a wide wiring space is necessary to avoid a contact of the wiring harness with the car body. In addition, since the wiring harness projects towards the car body, no good appearance is provided.

SUMMARY

One or more embodiments provide a wiring harness which can be bent stably in a predetermined direction when a sliding door is caused to slide towards and away from a car body of a vehicle and which can provide a good appearance by making a wiring space as small as possible.

In an aspect (1), one or more embodiments a wiring harness which is wired between a car body and a sliding door which slides between a closing position and an opening position so as to open and close a doorway in the car body, the wiring harness comprising:

an external member in which one end is supported rotatably about a perpendicular axis relative to the car body and in which the other end is supported rotatably about a perpendicular axis relative to the sliding door, wherein the external member includes bending portions at a sliding door side and at a car body side respectively in a closing state that the sliding door is disposed in the closing position, and wherein the bending portions are bent in opposite directions to each other, and a curvature radius of one of the bending portions is smaller than a curvature radius of the other of the bending portions.

In an aspect (2), one or more embodiments provide the wiring harness, wherein a curvature radius of the bending portion at the sliding door side is smaller than a curvature radius of the bending portion at the car body side.

In an aspect (3), one or more embodiments provide the wiring harness, wherein a curvature radius of the bending portion at the car body side is smaller than a curvature radius of the bending portion at the sliding door side.

In an aspect (4), one or more embodiments provide the wiring harness, wherein the wiring harness includes a biasing device which is provided on at least one of supporting portions at the car body side and at the sliding door side and which biases supported end of the external member about the perpendicular axis, and wherein a biasing force of the biasing device is adjusted so that the bending portions are formed in the external member.

In an aspect (5), one or more embodiments provide the wiring harness, wherein a length of the external member and supporting positions in which the external member is supported by the car body and by the sliding door respectively, are adjusted so that the bending portions are formed in the external member.

In an aspect (6), one or more embodiments provide the wiring harness, wherein the external member includes the bending portions formed in advance.

In an aspect (7), one or more embodiments provide the wiring harness, wherein the wiring harness includes a rotation restricting wall which restricts a rotation range of the supported end of the external member on at least one of the supporting portions at the car body side and at the sliding door side, wherein the rotation range of the supported end of the external member is adjusted by the rotation restricting wall so that the bending portions are formed in the external member.

In an aspect (8), one or more embodiments provide the wiring harness, wherein a size of an accommodating space of the external member is adjusted when the sliding door is closed, so that the bending portions are formed in the external member.

According to the aspect (1), when the sliding door is opened and closed, the wiring harness can be bent stably in the bending direction of the bending portion having the small curvature radius with the sliding door disposed in the closing position. This prevents the occurrence of such a drawback that the wiring harness is bent in an unintended direction not only to make it difficult for the sliding door to be opened and closed but also to damage the wiring harness when the sliding door is opened and closed, thereby making it possible to open and close the sliding door smoothly. In addition, when compared with a case where one bending portion which protrudes to one side is provided, the wiring space of the wiring harness when the sliding door is closed can be made as small as possible, thereby making it possible to provide a good appearance. In addition, the wiring harness can be refrained from being brought into contact with the car body and the sliding door, thereby making it possible to suppress the damage made to the wiring harness as a result of the sliding door being opened and closed repeatedly.

According to the aspect (2), the wiring harness can be bent stably in the bending direction of the bending portion which lies closer to the sliding door when the sliding door is opened and closed.

According to the aspect (3), the wiring harness can be bent stably in the bending direction of the bending portion which lies closer to the car body when the sliding door is opened and closed.

According to the aspect (4), it is possible to form easily the two bending portions having the different curvature radius and protruding in the opposite directions by adjusting the biasing force of the biasing device.

According to the aspect (5), it is possible to form easily the two bending portions having the different curvature radius and protruding in the opposite directions by adjusting the length of the external member and the supporting positions where the external member is supported on the car body and the sliding door.

According to the aspect (6), it is possible to form easily the two bending portions having the different curvature radius and protruding in the opposite directions by using the external member in which the bending portions are formed in advance.

According to the aspect (7), it is possible to form easily the two bending portions having the different curvature radius and protruding in the opposite directions by adjusting the range of rotation of the supported end of the external member about the perpendicular axis on at least one of the supporting portion on the car body where to support the external member and the supporting portion on the sliding door where to support the external member.

According to the aspect (8), it is possible to form easily the two bending portions having the different curvature radius and protruding in the opposite directions by deflecting the external member by adjusting the size of the accommodating space of the external member when the sliding door is closed.

Advantage of the Invention

According to the invention, it is possible to provide the wiring harness which can be bent stably in the predetermined direction when the sliding door is caused to slide to and away from the car body of the vehicle and which can provide a good appearance by making the wiring space as small as possible.

Thus, one or more embodiments will be clarified in detail which will be described below by reference to accompanying drawings.

BRIEF DESCRIPTION OF THE DRAWINGS

FIGS. 1A and 1B are drawings showing a wiring harness according to an embodiment.

DETAILED DESCRIPTION OF THE EMBODIMENTS

Hereinafter, embodiments of the invention will be described by reference to the drawings.

First Embodiment

Firstly, a wiring harness according to a first embodiment will be described.

Figures 1A, 1B:
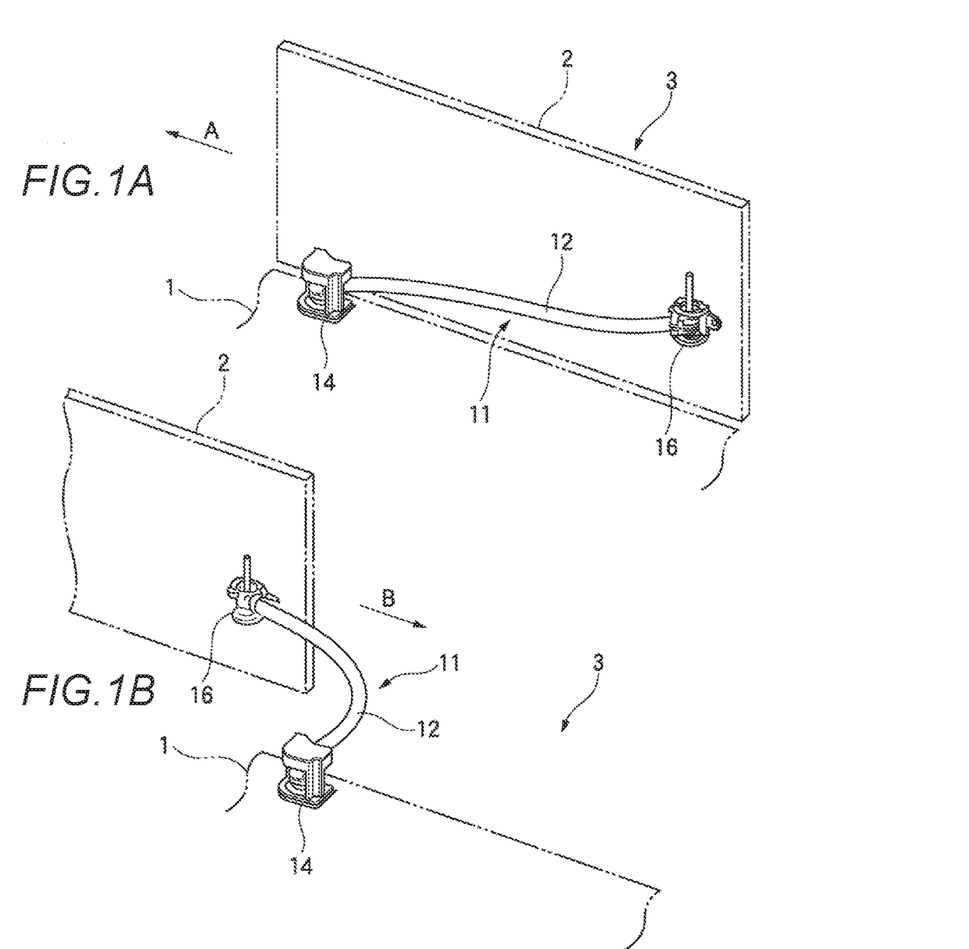
FIG. 1A is a perspective view of the wiring harness when a sliding door is closed and FIG. 1B is a perspective view of the wiring harness when the sliding door is opened.

FIGS. 1A and 1B are drawings showing a wiring harness according to the first embodiment, of which FIG. 1A is a perspective view of the wiring harness when a sliding door is closed and FIG. 1B is a perspective view of the wiring harness when the sliding door is opened.

As shown in FIGS. 1A and 1B, a wiring harness 11 according to the first embodiment is wired between a car body 1 of a vehicle such as a motor vehicle and a sliding door 2 which can slide towards and away from the car body 1. The sliding door 2 opens and closes a doorway 3 provided in the car body 1 by being caused to slide away from and to the car body 1, respectively. Specifically, as shown in FIG. 1A, the sliding door 2 is caused to slide in an opening direction A (a direction indicated by an arrow A in FIG. 1A) from a closed state where the sliding door 2 is disposed in a closing position to close the doorway 3, and as shown in FIG. 1B, the sliding door 2 is slid to be disposed in an opening position to open the doorway 3, whereby the doorway 3 is opened. On the contrary to this, as shown in FIG. 1B, the sliding door 2 is caused to slide in a closing direction B (a direction indicated by an arrow B in FIG. 1B) from the opening position, and as shown in FIG. 1A, the sliding door 2 is slid to be disposed in the closing position, whereby the doorway 3 is closed.

The wiring harness 11 is provided to supply electric power to various electric devices and accessories which are provided on the sliding door 2 or to transmit and receive signals between electric devices and accessories provided on the car body 1 and the electric devices and accessories provided on the sliding door 2. The wiring harness 11 has a plurality of bundles of electric wires (not shown), and the bundles of electric wires are passed through a corrugated tube (an external member) 12 for protection. The corrugated tube 12 is a tubular car body of a synthetic resin and is formed into bellows on an outer side thereof so as to be bent easily.

A car body side electricity supply device 14 is provided on the car body 1, and a door side electricity supply device 16 is provided on the sliding door 2. One end of the corrugated tube 12 of the wiring harness 11 is connected to the car body side electricity supply device 14 and the other end thereof is connected to the door side electricity supply device 16.

Figure 2:
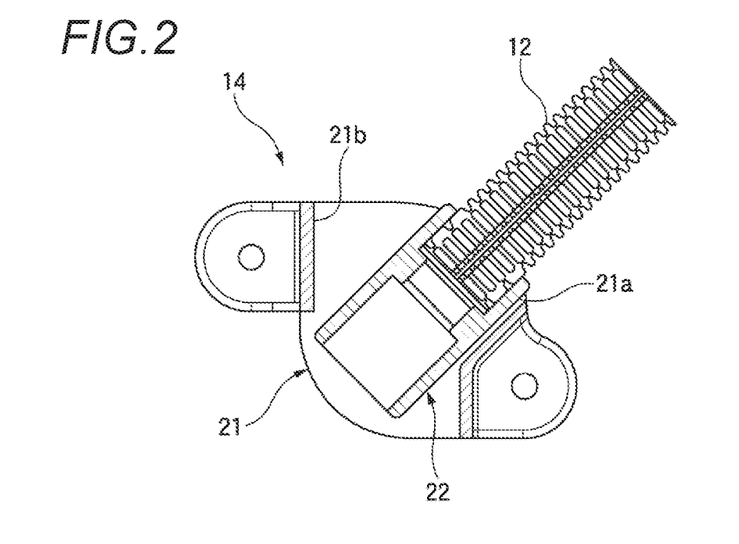
FIG. 2 is a horizontal sectional view of a car body side electricity supply device to which a car body side end portion of a corrugated tube of the wiring harness is connected.
Figure 3:
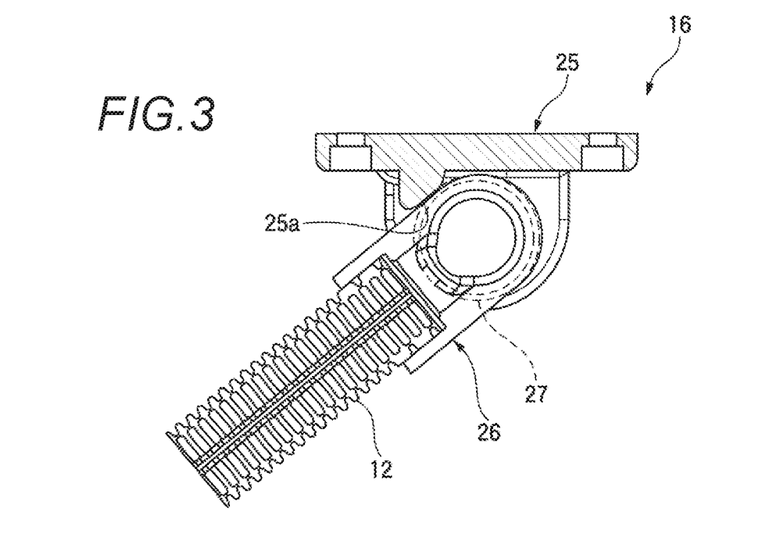
FIG. 3 is a horizontal sectional view of a door side electricity supply device to which a sliding door side end portion of the corrugated tube of the wiring harness is connected.

FIG. 2 is a horizontal sectional view of the car body side electricity supply device to which the car body side end portion of the corrugated tube of the wiring harness is connected. FIG. 3 is a horizontal sectional view of the door side electricity supply device to which the sliding door side end portion of the corrugated tube of the wiring harness is connected.

As shown in FIG. 2, the car body side electricity supply device 14 includes an outer member 21 of a synthetic resin which is fixed to the car body 1 and an inner member 22 which is supported on the outer member 21 so as to rotate (swing) freely in a horizontal direction and which supports the end portion of the corrugated tube 12 of the wiring harness 11. The car body side electricity supply device 14 supports the corrugated tube 12 so as to rotate freely in the horizontal direction about an axis which passes the end portion of the corrugated tube 12 in a perpendicular direction by the use of the outer member 21 and the inner member 22. The outer member 21 has rotation restricting walls 21a, 21b, and the inner member 22 is brought into abutment with the rotation restricting walls 21a, 21b, whereby a rotational range of the inner member 22 is restricted.

As shown in FIG. 3, the door side electricity supply device 16 includes an outer member 25 which is fixed to an inner panel of the sliding door 2 and an inner member 26 which is supported on the outer member 25 so as to rotate (swing) freely in a horizontal direction and which supports the end portion of the corrugated tube 12 of the wiring harness 11. The door side electricity supply device 16 supports the corrugated tube 12 so as to rotate freely in the horizontal direction about an axis which passes the end portion of the corrugated tube 12 in a perpendicular direction by the use of the outer member 25 and the inner member 26. The outer member 25 has a rotation restricting wall 25a, and the inner member 26 is brought into abutment with the rotation restricting wall 25a, whereby a rotational range of the inner member 26 is restricted. In addition, the door side electricity supply device 16 includes a spring member (a biasing device) 27 which biases the inner member 26 towards the car body 1.

Then, in the car body side electricity supply device 14 and the door side electricity supply device 16, when the sliding door 2 is opened and closed, the inner members 22, 26 to which the end portions of the corrugated tube 12 are connected rotate about the perpendicular axes in such a way as to match the movement of the corrugated tube 12 of the wiring harness 11. This prevents the end portions of the wiring harness 11 from being forced to bend when the sliding door 2 is opened and closed.

Figure 4:
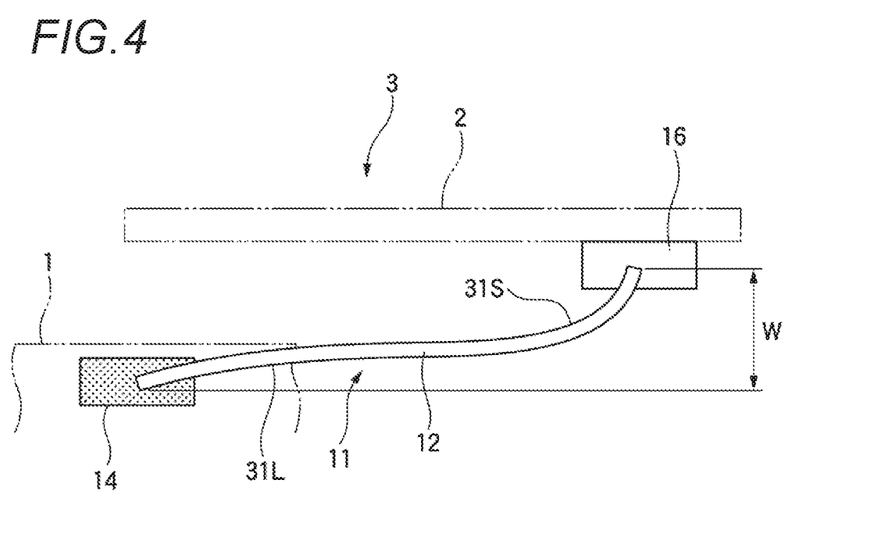
FIG. 4 is a schematic plan view illustrating a shape of the corrugated tube of the wiring harness according to a first embodiment which the corrugated tube takes when the sliding door is closed.

FIG. 4 is a schematic plan view illustrating a shape of the corrugated tube of the wiring harness according to the first embodiment which results when the sliding door is closed.

As shown in FIG. 4, in the wiring harness 11 according to the first embodiment, adjusting the elastic force of the spring member 27 provided on the door side electricity supply device 16 forms a small bending portion 31S and a large bending portion 31L in the corrugated tube 12 when the sliding door 2 is closed (refer to FIG. 1A). The small bending portion 31S is formed so as to have a curvature radius which is smaller than that of the large bending portion 31L. The small bending portion 31S is formed at a portion on the wiring harness 11 which lies closer to the sliding door 2, and the large bending portion 31L is formed at a portion on the wiring harness 11 which lies closer to the car body 1. The small bending portion 31S protrudes in an opposite direction to a direction in which the large bending portion 31L protrudes. Specifically, the corrugated tube 12 is bent so as to protrude towards the car body side 1 at the small bending portion 31S which lies closer to the sliding door 2, whereas the corrugated tube 12 is bent so as to protrude towards the sliding door 2 at the large bending portion 31L which lies closer to the car body 1.

Next, the movement of the wiring harness 11 when the sliding door 2 is opened and closed will be described.

FIGS. 5A to 5E, which are schematic plan views, are drawings showing a series of changes in shape of the corrugated tube when the sliding door is opened and closed. FIG. 6 is a schematic plan view showing altogether the series of changes in shape of the corrugated tube when the sliding door is opened and closed.

(Changes in Shape when the Sliding Door Slides to be Opened)

Figure 5A:
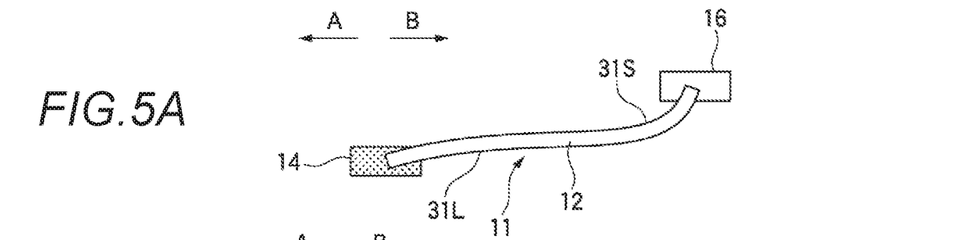
FIGS. 5A to 5E, which are schematic plan views, are drawings showing a series of changes in shape of the corrugated tube when the sliding door is opened and closed.
Figure 5B:
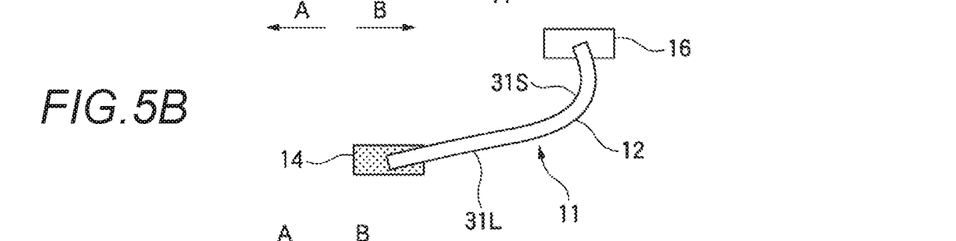
Figure 6:
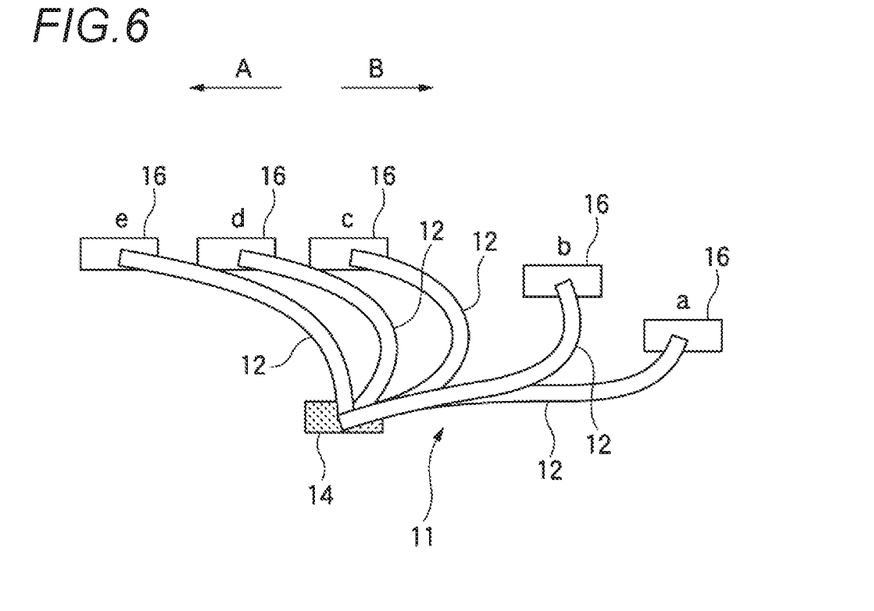
FIG. 6 is a schematic plan view showing altogether the series of changes in shape of the corrugated tube resulting when the sliding door is opened and closed.

As shown in FIG. 5A, when the sliding door 2 is started to be opened from a closed state (a state denoted by "a" in FIG. 6), in the corrugated tube 12 of the wiring harness 11, as shown in FIG. 5B, a range of a bending portion at the small bending portion 31S gradually becomes larger as a result of the door side electricity supply device 16 moving towards the car body side electricity supply device 14, whereby the curvature radius of the large bending portion 31L gradually becomes larger into a straight line (a state denoted by "b" in FIG. 6).

Figure 5C:
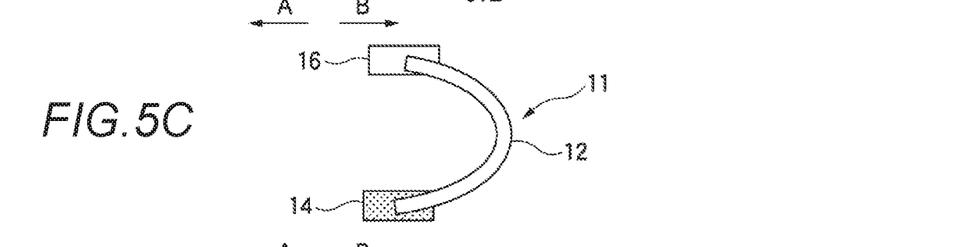

As shown in FIG. 5C, when the sliding door 2 slides further in the opening direction A, whereby the door side electricity supply device 16 is aligned with the car body side electricity supply device 14 in the sliding direction of the sliding door 2 towards the opening direction A, the large bending portion 31L is eliminated in the corrugated tube 12, and the whole of the corrugated tube 12 is bent in the bending direction of the small bending portion 31S (a state denoted by "c" in FIG. 6).

Figure 5D:
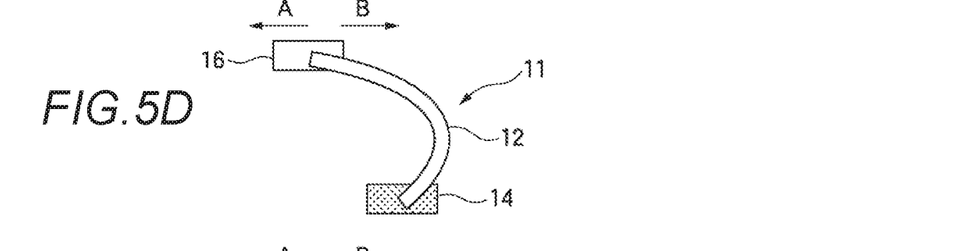

As shown in FIG. 5D, when the sliding door 2 slides furthermore in the opening direction A, whereby the door side electricity supply device 16 moves to be further forwards than the car body side electricity supply device 14 in the sliding direction of the sliding door 2 towards the opening direction A, a portion of the corrugated tube 12 which lies closer to the sliding door 2 is pulled forwards by the door side electricity supply device 16. In the corrugated tube 12, the state where the corrugated tube 12 is bent in the bending direction of the small bending portion 31S (a state denoted by "d" in FIG. 6) is maintained.

Figure 5E:
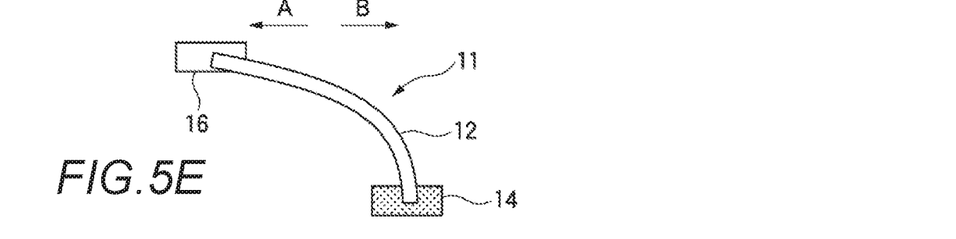

As shown in FIG. 5E, when the sliding door 2 slides to the opening position, the portion of the corrugated tube 12 which lies closer to the sliding door 2 is pulled further forwards by the door side electricity supply device 16. In addition, the corrugated tube 12 is kept bending in the bending direction of the small bending portion 31S with the curvature radius thereof increased (a state denoted by "e" in FIG. 6).

(Changes in Shape when the Sliding Door Slides to be Closed)

As shown in FIG. 5E, when the sliding door 2 starts sliding to be closed from the opened state (the state denoted by "e" in FIG. 6), as shown in FIG. 5D, in the corrugated tube 12 of the wiring harness 11, a range of a bending portion which bends in the bending direction of the small bending portion 31S gradually becomes larger as a result of the door side electricity supply device 16 moving towards the car body side electricity supply device 14 (the state denoted by "d" in FIG. 6).

As shown in FIG. 5C, when the sliding door 2 slides further in the closing direction B and the door side electricity supply device is aligned with the car body side electricity supply device 14 in the sliding direction of the sliding door 2 towards the closing direction B, the whole of the corrugated tube 12 bends in the bending direction of the small bending portion 31S (the state denoted by "c" in FIG. 6).

As shown in FIG. 5B, when the sliding door 2 slides furthermore in the closing direction B, whereby the door side electricity supply device 16 moves to be further forwards than the car body side electricity supply device 14 in the sliding direction of the sliding door 2 towards the closing direction B, a bending force is applied to a portion of the corrugated tube 12 which lies closer to the sliding door 2, whereby the range of the bending portion moves towards the sliding door 2, which forms a small bending portion 31S having a small curvature radius. A portion of the corrugated tube 12 which lies closer to the car body 1 is extended into a straight line (the state denoted by "b" in FIG. 6).

As shown in FIG. 5A, when the sliding door 2 slides to the closing position, the curvature radius of the small bending portion 31S which is formed in the corrugated tube 12 at the portion which lies closer to the sliding door 2 becomes smaller, while a portion of the corrugated tube 12 which lies closer to the car body 1 protrudes towards the sliding door 2, whereby a large bending portion 31L is formed which has a curvature radius larger than that of the small bending portion 31S (the state denoted by "a" in FIG. 6).

In this way, according to the wiring harness 11 of the first embodiment, when the sliding door 2 is opened and closed, the wiring harness 11 can be bent stably in the bending direction of the small bending portion 31S having the small curvature radius with the sliding door 2 disposed in the closing position. This prevents the occurrence of such a drawback that the corrugated tube 12 of the wiring harness 11 is bent in an unintended direction not only to make it difficult for the sliding door 2 to be opened and closed but also to damage the wiring harness 11 when the sliding door 2 is opened and closed, thereby making it possible to open and close the sliding door 2 smoothly.

Figure 7:
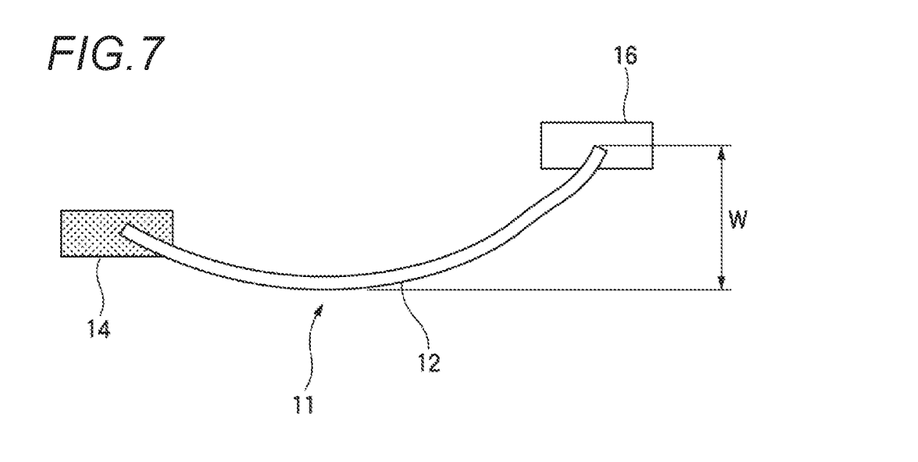
FIG. 7 is a schematic plan view of a wiring harness according to a comparison example.

Incidentally, as shown in FIG. 7, the whole of the corrugated tube 12 can also be bent to protrude in one direction with the sliding door 2 disposed in the closed state or in the closing position, so that the corrugated tube 12 can be bent stably in the predetermined protruding direction when the sliding door 2 is opened and closed.

In this case, however, since the whole of the corrugated tube 12 is bent to protrude in the one direction with the sliding door 2 disposed in the closing position, the wiring harness 11 is caused to project towards the side where the corrugated tube 12 or the wiring harness 11 protrudes with the sliding door 2 disposed in the closing position. This increases a widthwise dimension W of a wiring space of the wiring harness 11, whereby the appearance is deteriorated. In addition, in the event that the wiring harness 11 is bent to protrude towards the car body 1, the wiring harness 11 is brought into contact with the car body 1, whereas in the event that the wiring harness 11 is bent to protrude towards the sliding door 2, the wiring harness 11 is brought into contact with the sliding door 2. This may result in fears that the wiring harness 11 is damaged as a result of the sliding door 2 being opened and closed repeatedly.

In contrast with the example described above, in the wiring harness 11 according to the first embodiment, the small bending portion 31S and the large bending portion 31L, which protrude in the opposite directions, are formed at the portion of the corrugated tube 12 which lies closer to the sliding door 2 and the portion thereof which lies closer to the car body 1, respectively. Thus, the projection of the wiring harness 11 is suppressed to as small a level as possible when the sliding door 2 is closed to reduce the widthwise dimension W of the laying-out space, whereby the appearance can be improved (refer to FIG. 4). In addition, the wiring harness 11 is restrained from being brought into contact with the car body 1 and the sliding door 2, whereby the wiring harness 11 can be restrained from being damaged even when the sliding door 2 is opened and closed repeatedly.

In addition, the two bending portions of the small bending portion 31S and the large bending portion 31L which protrude in the opposite directions with the different curvature radius can easily be formed by adjusting the biasing force of the spring member 27 which is provided on the door side electricity supply device 16.

The method of forming the small bending portion 31S and the large bending portion 31L in the corrugated tube 12 of the wiring harness 11 is not limited to the adjustment of the biasing force of the spring member 27. For example, the two bending portions of the small bending portion 31S and the large bending portion 31L which protrude in the opposite directions with the different curvature radius can easily be formed by adjusting the length of the corrugated tube and the supporting positions of the corrugated tube 12 by the car body side electricity supply device 14 and the door side electricity supply device 16, using a corrugated tube 12 which is formed in advance to have a small being portion 31S and a large bending portion 31L, or adjusting the rotational ranges of the inner members 22, 26 of the car body side electricity supply device 14 and the door side electricity supply device 16 by using the rotation restricting walls 21a, 21b, 25a. In addition, the small bending portion 31S and the large bending portion 31L can also be formed in the corrugated tube 12 by deflecting the corrugated tube 12 by adjusting the size of the accommodating space of the corrugated tube 12 on the vehicle when the sliding door 2 is closed.

Second Embodiment

Next, a wiring harness according to a second embodiment of the invention will be described.

Like reference numerals will be given to like constituent portions to those of the first embodiment, and the description thereof will be omitted here.

Figure 8:
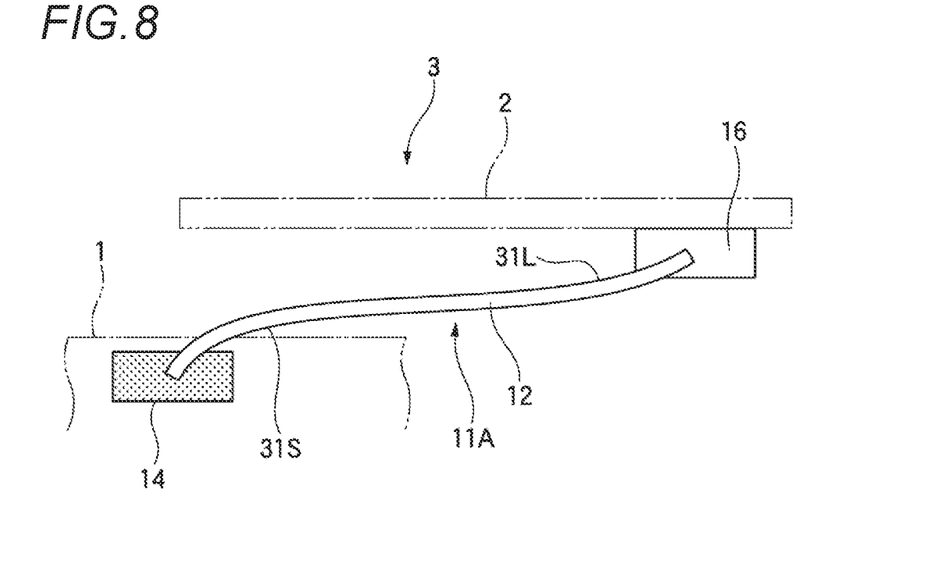
FIG. 8 is a schematic plan view of a corrugated tube of a wiring harness according to a second embodiment illustrating a shape of the corrugated tube resulting when a sliding door is closed.

FIG. 8 is a schematic plan view illustrating a shape of a corrugated tube of a wiring harness according to the second embodiment when a sliding door is closed.

As shown in FIG. 8, in the case of a wiring harness 11A according to the second embodiment, too, a small bending portion 31S and a large bending portion 31L are formed in a corrugated tube 12 when a sliding door 2 is closed (refer to FIG. 1A). The small bending portion 31S is formed at a portion of the corrugated tube 12 which lies closer to a car body 1, whereas the large bending portion 31L is formed at a portion of the corrugated tube 12 which lies closer to the sliding door 2. The small bending portion 31S is caused to bend in an opposite direction to a direction in which the large bending portion 31L is caused to bend. Specifically, the corrugated tube 12 is bent to protrude towards the car body 1 at the large bending portion 31L which lies closer to the sliding door 2, whereas the corrugated tube 12 is bent to protrude towards the sliding door 2 at the small bending portion 31S which lies closer to the car body 1.

Next, the movement of the wiring harness 11A when the sliding door 2 is opened and closed will be described.

FIGS. 9A to 9E, which are schematic plan views, are drawings showing a series of changes in shape of the corrugated tube when the sliding door is opened and closed. FIG. 10 is a schematic plan view showing altogether the series of changes in shape of the corrugated tube when the sliding door is opened and closed.

(Changes in Shape when the Sliding Door Slides to be Opened)

Figure 9A:
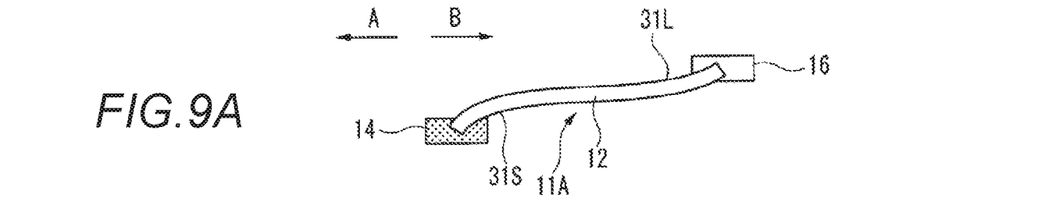
FIGS. 9A to 9E, which are schematic plan views, are drawings showing a series of changes in shape of the corrugated tube when the sliding door is opened and closed.
Figure 9B:
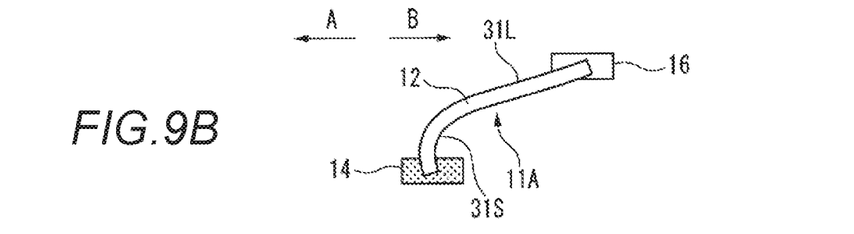
Figure 10:
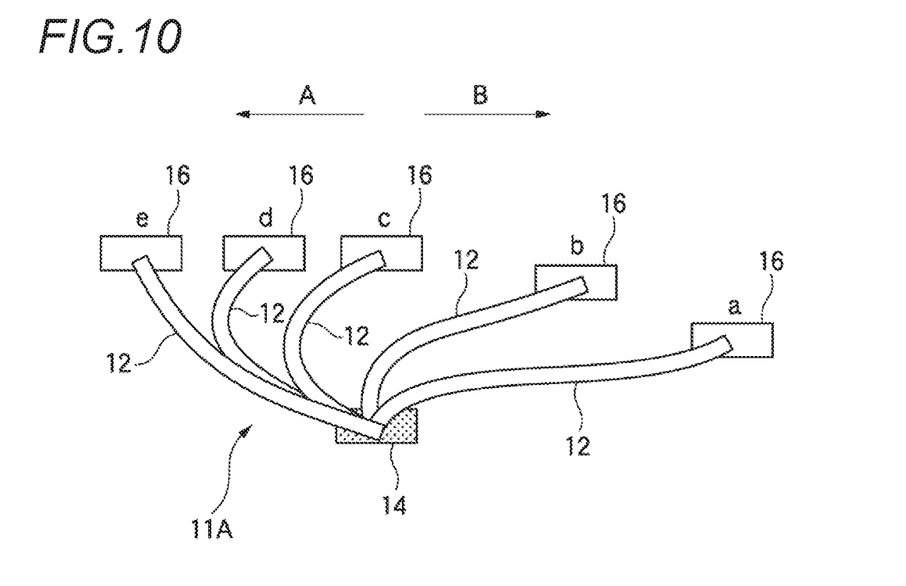
FIG. 10 is a schematic plan view showing altogether the series of changes in shape of the corrugated tube resulting when the sliding door is opened and closed.

As shown in FIG. 9A, when the sliding door 2 is started to be opened from a closed state (a state denoted by "a" in FIG. 10), in the corrugated tube 12 of the wiring harness 11A, as shown in FIG. 9B, a range of a bending portion at the small bending portion 31S gradually becomes larger as a result of a door side electricity supply device 16 moving towards a car body side electricity supply device 14, whereby a curvature radius of the large bending portion 31L gradually becomes larger into a straight line (a state denoted by "b" in FIG. 10).

Figure 9C:
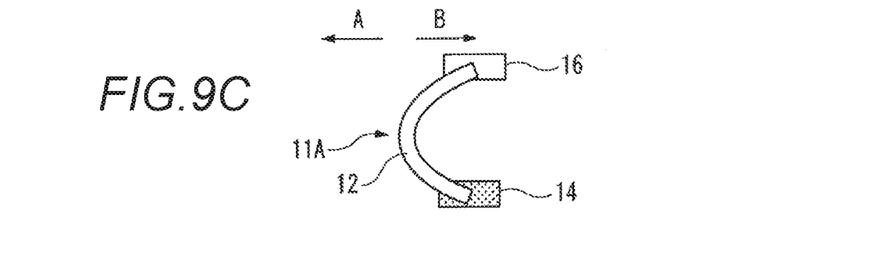

As shown in FIG. 9C, when the sliding door 2 slides further in an opening direction A, whereby the door side electricity supply device 16 is aligned with the car body side electricity supply device 14 in a sliding direction of the sliding door 2 towards the opening direction A, the large bending portion 31L is eliminated in the corrugated tube 12, and the whole of the corrugated tube 12 is bent in a bending direction of the small bending portion 31S (a state denoted by "c" in FIG. 10).

Figure 9D:
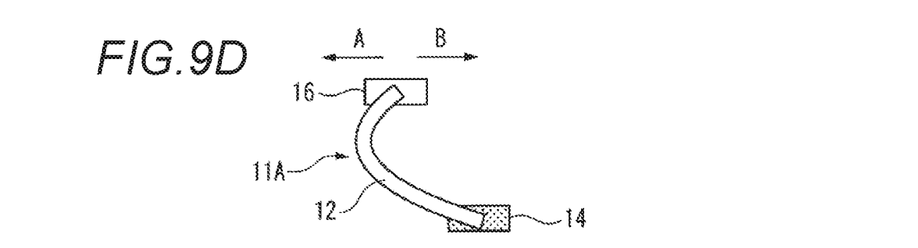

As shown in FIG. 9D, when the sliding door 2 slides furthermore in the opening direction A, whereby the door side electricity supply device 16 moves to be further forwards than the car body side electricity supply device 14 in the sliding direction of the sliding door 2 towards the opening direction A, a portion of the corrugated tube 12 which lies closer to the sliding door 2 is pushed forwards by the door side electricity supply device 16. In the corrugated tube 12, the state where the corrugated tube 12 is bent in the bending direction of the small bending portion 31S (a state denoted by "d" in FIG. 10) is maintained.

Figure 9E:
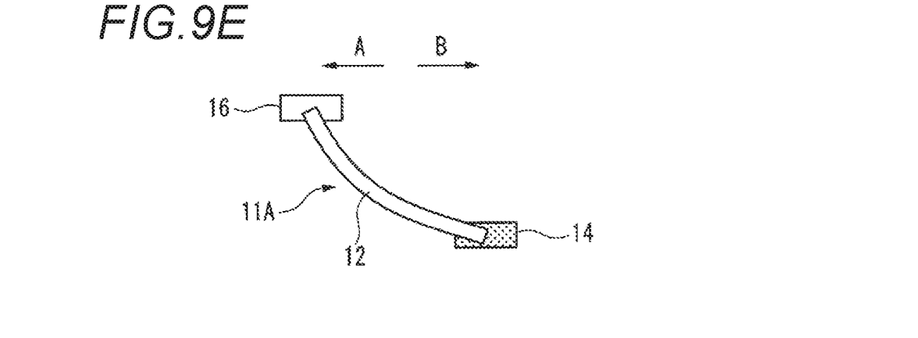

As shown in FIG. 9E, when the sliding door 2 slides to the opening position, the portion of the corrugated tube 12 which lies closer to the sliding door 2 is pushed further forwards by the door side electricity supply device 16. In addition, the corrugated tube 12 is kept bending in the bending direction of the small bending portion 31S with the curvature radius thereof increased (a state denoted by "e" in FIG. 10).

(Changes in Shape when the Sliding Door Slides to be Closed)

As shown in FIG. 9E, when the sliding door 2 starts sliding to be closed from the opened state (the state denoted by "e" in FIG. 10), as shown in FIG. 9D, in the corrugated tube 12 of the wiring harness 11A, a range of a bending portion which bends in the bending direction of the small bending portion 31S gradually becomes large as a result of the door side electricity supply device 16 moving towards the car body side electricity supply device 14 (the state denoted by "d" in FIG. 10).

As shown in FIG. 9C, when the sliding door 2 slides further in a closing direction B to thereby be aligned with the car body side electricity supply device 14 in the sliding direction of the sliding door 2 towards the closing direction B, the whole of the corrugated tube 12 bends in the bending direction of the small bending portion 31S (the state denoted by "c" in FIG. 10).

As shown in FIG. 9B, when the sliding door 2 slides furthermore in the closing direction B, whereby the door side electricity supply device 16 moves to be further forwards than the car body side electricity supply device 14 in the sliding direction of the sliding door 2 towards the closing direction B, a bending force is applied to a portion of the corrugated tube 12 which lies closer to the car body 1, whereby the range of the bending portion moves towards the car body 1, which forms a small bending portion 31S having a small curvature radius. A portion of the corrugated tube 12 which lies closer to the sliding door 2 is extended into a straight line (the state denoted by "b" in FIG. 10).

As shown in FIG. 9A, when the sliding door 2 slides to the closing position, the curvature radius of the small bending portion 31S which is formed in the corrugated tube 12 at the portion which lies closer to the car body 1 becomes smaller, while a portion of the corrugated tube 12 which lies closer to the sliding door 2 protrudes towards the car body 1, whereby a large bending portion 31L is formed which has a curvature radius larger than that of the small bending portion 31S (the state denoted by "a" in FIG. 10).

In the case of the wiring harness 11A according to the second embodiment, too, when the sliding door 2 is opened and closed, the wiring harness 11A can be bent stably in the bending direction of the small bending portion 31S having the small curvature radius with the sliding door 2 disposed in the closing position. This prevents the occurrence of such a drawback that the corrugated tube 12 of the wiring harness 11A is bent in an unintended direction not only to make it difficult for the sliding door 2 to be opened and closed but also to damage the wiring harness 11 when the sliding door 2 is opened and closed, thereby making it possible to open and close the sliding door 2 smoothly. In addition, when compared with the case where the one bending portion which protrudes to the one side is provided, the wiring space of the wiring harness 11 when the sliding door 2 is closed can be made as small as possible, thereby making it possible to provide a good appearance. In addition, the wiring harness 11 can be refrained from being brought into contact with the car body 1 and the sliding door 2, thereby making it possible to suppress the damage made to the wiring harness 11 as a result of the sliding door 2 being opened and closed repeatedly.

The invention is not limited to the embodiments which have been described heretofore and hence can be modified or improved as required. In addition, the materials, shapes, numbers, and disposing locations of the constituent elements are arbitrary and are not limited to those described in the embodiments, provided that the invention can be achieved.

Here, the characteristics of one or more embodiments of the wiring harness will be summarized item by item under [1] to [8] below.

[1] A wiring harness (11, 11A) which is wired between a car body (1) and a sliding door (2) which slides between a closing position and an opening position so as to open and close a doorway (3) in the car body (1), the wiring harness (11, 11A) comprising:

an external member (a corrugated tube 12) in which one end is supported rotatably about a perpendicular axis relative to the car body (1) and in which the other end is supported rotatably about a perpendicular axis relative to the sliding door (2), wherein the external member (the corrugated tube 12) includes bending portions (small bending portion 31S, large bending portion 31L) at a sliding door (2) side and at a car body (1) side respectively in a closing state that the sliding door (2) is disposed in the closing position, and wherein the bending portions (the small bending portion 31S, the large bending portion 31L) are bent in opposite directions to each other, and a curvature radius of one of the bending portions is smaller than a curvature radius of the other of the bending portions.

[2] The wiring harness according to [1], wherein a curvature radius of the bending portion (the small bending portion 31S) at the sliding door (2) side is smaller than a curvature radius of the bending portion (the large bending portion 31L) at the car body (1) side.

[3] The wiring harness according to [1], wherein the curvature radius of the bending portion (the small bending portion 31S) at the car body (1) side is smaller than a curvature radius of the bending portion (the large bending portion 31L) at the sliding door (2) side.

[4] The wiring harness according to anyone of [1] to [3], wherein the wiring harness includes a biasing device (a spring member 27) which is provided on at least one of supporting portions at the car body (1) side and at the sliding door (2) side, which biases supported end of the external member (the corrugated tube 12) about the perpendicular axis, and wherein a biasing force of the biasing device (the spring member) is adjusted so that the bending portions (the small bending portion 31S, the large bending portion 31L) are formed in the external member (the corrugated tube 12).

[5] The wiring harness according to anyone of [1] to [3], wherein a length of the external member (the corrugated tube 12) and supporting positions in which the external member (the corrugated tube 12) is supported by the car body (1) and by the sliding door (2) respectively, are adjusted so that the bending portions (the small bending portion 31S, the large bending portion 31L) are formed in the external member (the corrugated tube 12).

[6] The wiring harness according to anyone of [1] to [3], wherein the external member (the corrugated tube 12) includes the bending portions (the small bending portion 31S, the large bending portion 31L) formed in advance.

[7] The wiring harness according to anyone of [1] to [3], wherein the wiring harness includes a rotation restricting wall (21a, 21b, 25a) which restricts a rotation range of the supported end of the external member (the corrugated tube 12) on at least one of the supporting portions at the car body (1) side and at the sliding door (2) side, wherein the rotation range of the supported end of the external member (the corrugated tube 12) is adjusted by the rotation restricting wall (21a, 21b, 25a), so that the bending portions (the small bending portion 31S, the large bending portion 31L) are formed in the external member (the corrugated tube 12).

[8] The wiring harness according to anyone of [1] to [3], wherein a size of an accommodating space of the external member (the corrugated tube 12) is adjusted when the sliding door (2) is closed, so that the bending portions (the small bending portion 31S, the large bending portion 31L) are formed in the external member (the corrugated tube 12).

While the invention has been described in detail and by reference to the specific embodiments, it is obvious to those skilled in the art to which the invention pertains that various alterations or modifications can be made to those embodiments without departing from the spirit and scope of the invention.

This patent application is based on Japanese Patent Application (No. 2014-218372) filed on Oct. 27, 2014, the contents of which are incorporated herein by reference.

INDUSTRIAL APPLICABILITY

According to the invention, it is possible to provide advantageously the wiring harness which can be caused to bend stably in the predetermined direction when the sliding door is caused to slide to and away from the car body and which can obtain the good appearance by suppressing the wiring space to as low a level as possible. The invention which can provide the advantage described above is useful in application to the wiring harness which is wired between the car body and the sliding door of the vehicle.

DESCRIPTION OF REFERENCE NUMERALS AND SIGNS 1 car body; 2 sliding door; 3 doorway; 11, 11A wiring harness; 12 corrugated tube (external member); 21a, 21b, 25a rotation restricting wall; 27 spring member (biasing device); 31L large bending portion (bending portion); 31S small bending portion (bending portion)

What is claimed:

1. A wiring harness which is wired between a car body and a sliding door which slides between a closing position and an opening position so as to open and close a doorway in the car body, the wiring harness comprising:

an external member in which one end is supported rotatably about a perpendicular axis relative to the car body and in which the other end is supported rotatably about a perpendicular axis relative to the sliding door, wherein the external member includes bending portions at a sliding door side and at a car body side respectively in a closing state that the sliding door is disposed in the closing position, wherein the bending portions are bent in opposite directions to each other, and a curvature radius of one of the bending portions is smaller than a curvature radius of another of the bending portions, and wherein the curvature radius of the other of the bending portions gradually becomes larger, as the one end and the other end become closer to each other from the closing position of the sliding door.

2. The wiring harness according to claim 1, wherein a curvature radius of a bending portion, of the bending portions, at the sliding door side is smaller than a curvature radius of a bending portion, of the bending portions, at the car body side.

3. The wiring harness according to claim 1, wherein a curvature radius of a bending portion, of the bending portions, at the car body side is smaller than a curvature radius of a bending portion, of the bending portions, at the sliding door side.

4. The wiring harness according to claim 1, wherein the wiring harness includes a biasing device which is provided on at least one of supporting portions at the car body side and at the sliding door side and which biases the supported end of the external member about the perpendicular axis, and wherein a biasing force of the biasing device is adjusted so that the bending portions are formed in the external member.

5. The wiring harness according to claim 1, wherein a length of the external member and supporting positions in which the external member is supported by the car body and by the sliding door respectively, are adjusted so that the bending portions are formed in the external member.

6. The wiring harness according to claim 1, wherein the external member includes the bending portions being preformed.

7. The wiring harness according to claim 1,
wherein the wiring harness includes a rotation restricting wall which restricts a rotation range of the supported end of the external member on at least one of supporting portions at the car body side and at the sliding door side, and
wherein the rotation range of the supported end of the external member is adjusted by the rotation restricting wall so that the bending portions are formed in the external member.

8. The wiring harness according to claim 1, wherein a size of an accommodating space of the external member is adjusted when the sliding door is closed, so that the bending portions are formed in the external member.

* * * * *